US012369240B2

(12) United States Patent
Peng

(10) Patent No.: US 12,369,240 B2
(45) Date of Patent: Jul. 22, 2025

(54) LED EQUIPMENT WITH CONSTANT VOLTAGE CONTROL AND LED STRING COMPRISING THE SAME

(71) Applicant: SEMISILICON TECHNOLOGY CORP., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 160 days.

(21) Appl. No.: 18/178,106

(22) Filed: Mar. 3, 2023

(65) Prior Publication Data

US 2024/0206038 A1 Jun. 20, 2024

(30) Foreign Application Priority Data

Dec. 15, 2022 (TW) ................................ 111148289

(51) Int. Cl.

| | |
|---|---|
| ***H05B 45/46*** | (2020.01) |
| ***H05B 45/10*** | (2020.01) |
| ***H05B 45/34*** | (2020.01) |
| ***H05B 45/54*** | (2020.01) |

(52) U.S. Cl.

CPC ............. *H05B 45/46* (2020.01); *H05B 45/10* (2020.01); *H05B 45/34* (2020.01); *H05B 45/54* (2020.01)

(58) Field of Classification Search

CPC ........ H05B 45/46; H05B 45/10; H05B 45/34; H05B 45/54

See application file for complete search history.

(56) References Cited

U.S. PATENT DOCUMENTS

| | | | | |
|---|---|---|---|---|
| 9,924,574 | B1 * | 3/2018 | Fernandez | H05B 45/395 |
| 2017/0265260 | A1 * | 9/2017 | Briggs | H05B 45/39 |
| 2018/0035507 | A1 * | 2/2018 | Kumada | H05B 45/10 |
| 2021/0120642 | A1 | 4/2021 | Zhang | |
| 2022/0039233 | A1 * | 2/2022 | Archer | H05B 45/36 |
| 2022/0094153 | A1 * | 3/2022 | Archer | H02H 3/42 |

FOREIGN PATENT DOCUMENTS

| | | | |
|---|---|---|---|
| CN | 102626003 | A | 8/2012 |
| CN | 108055718 | A | 5/2018 |
| TW | 202044923 | A | 12/2020 |

OTHER PUBLICATIONS

Office Action dated Oct. 18, 2023 of the corresponding Taiwan patent application No. 111148289.

* cited by examiner

*Primary Examiner* — Minh Tran
(74) *Attorney, Agent, or Firm* — MUNCY, GEISSLER, OLDS & LOWE, P.C.

(57) ABSTRACT

An LED equipment with constant voltage control receives a DC voltage and includes a first controller, at least one LED, at least one switch and a voltage control circuit. The first controller includes a positive end and a negative end, and the positive end receives the DC voltage. The LED includes an anode end and a cathode end, and the LED is correspondingly coupled in series with the switch, so that a number of the LED corresponds to the number of switch. The voltage control circuit is coupled to the positive end and the negative end, and the voltage control circuit controls a voltage across the positive end and the negative end to a fixed voltage, so that a first current flowing through the LED inside each LED equipment is consistent.

10 Claims, 6 Drawing Sheets

LED EQUIPMENT WITH CONSTANT VOLTAGE CONTROL AND LED STRING COMPRISING THE SAME

BACKGROUND

Technical Field

The present disclosure relates to an LED equipment and an LED string, and more particularly to the LED equipment with constant voltage control and the LED string thereof.

Description of Related Art

Since the application of a light-emitting diode (LED) is becoming increasingly popular, and its manufacturing cost is getting lower and lower, the application of the LED in lighting or display is becoming more extensive. Correspondingly, there are more diverse methods of operating and controlling the light-emitting operation of the LED. Specifically, FIG. 1 is a block circuit diagram of an internal circuit of a related-art LED equipment. The LED equipment 200 includes a first controller 1, LEDs and switches. The LEDs are corresponding coupled in series with the switches, and the controller controls the light up/off of the LEDs by controlling the switches to be turned on/off. When the controller controls the switches to be turned on, the current flows through the LEDs to light up the LEDs, otherwise it will be lighted off.

The brightness of the LED is determined by the current flowing through the LED. When the current flowing through the LED is larger, the LED will be brighter, otherwise it will be darker. On the other hand, according to Ohm's law, the magnitude of the current is determined by the working voltage VCC received by the LED equipment 200. When the working voltage VCC is higher, the current flowing through the LED will be larger, and otherwise it will be smaller. However, since there are generally multiple LED equipment 200 in the LED string, and the light string has line loss on the path for transmitting the working voltage VCC, so that the working voltage VCC received by each LED equipment 200 will be different due to the line loss, thus causing the brightness of each LED to be different.

Therefore, it is a major topic for the inventors of the present disclosure to design an LED equipment with constant voltage control and an LED string thereof to avoid the problem of non-uniform brightness of LEDs due to the different working voltages received by the LED equipment.

SUMMARY

In order to solve the above-mentioned problems, the present disclosure provides an LED equipment with constant voltage control. The LED equipment is configured to receive a DC voltage and includes a first controller, at least one LED, at least one switch and a voltage control circuit. The first controller includes a positive end and a negative end, and the positive end receives the DC voltage. The at least one LED includes an anode end and a cathode end. The at least one switch is coupled in series with the at least one LED, and a number of the at least one LED corresponds to a number of the at least one switch. The voltage control circuit is coupled to the positive end and the negative end. The first controller is configured to control the at least one switch to be turned on or turned off based on the first control signal, so as to generate a first current flowing from the anode end to the cathode end when the at least one switch is turned on; the voltage control circuit is configured to control a voltage across the positive end and the negative end to a fixed voltage, so as to control the first current to be a fixed current.

In order to solve the above-mentioned problems, the present disclosure provides an LED string with constant voltage control. The LED string is configured to receive a DC voltage and includes a power line, a plurality of LED equipment and a second controller. The power line is configured to receive the input voltage, and the LED equipment are coupled to the power line. The second controller is coupled to the LED equipment and is configured to provide a lighting signal to the LED equipment based on a lighting command, so that the LED equipment provides the first control signal based on the lighting signal. Each of the LED equipment further includes a first signal receiving end and a first signal output end, the LED equipment are sequentially couple with each in a manner that the first signal output end of the LED equipment is coupled to the first signal receiving end of a next-stage equipment to form a serial connection, the first signal receiving end of the LED equipment coupled which is a first one in the serial connection is coupled to the second controller, so that the lighting signal is transmitted to each LED equipment through an internal transmission of the LED equipment.

The main purpose and effect of the present disclosure is that the present disclosure mainly controls the voltage across the positive end and the negative end of the LED equipment to be the fixed voltage through the voltage control circuit, so that the first current flowing through the at least one LED inside each LED equipment is consistent, so as to achieve the effect of at least one LED inside each LED equipment that can be controlled to be consistent.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
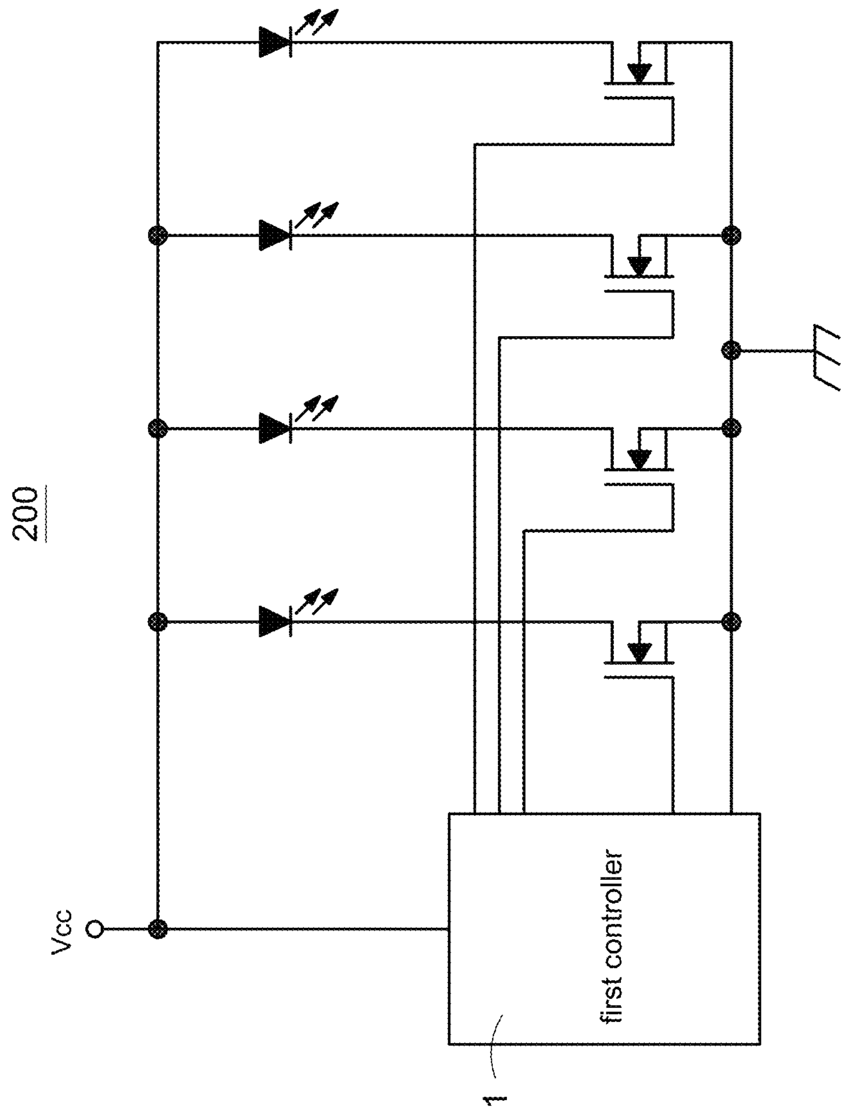
FIG.1 (Related Art)
FIG. 1 is a block circuit diagram of an internal circuit of a related-art LED equipment.

Reference will now be made to the drawing figures to describe the present disclosure in detail. It will be understood that the drawing figures and exemplified embodiments of present disclosure are not limited to the details thereof.

Figure 2A:
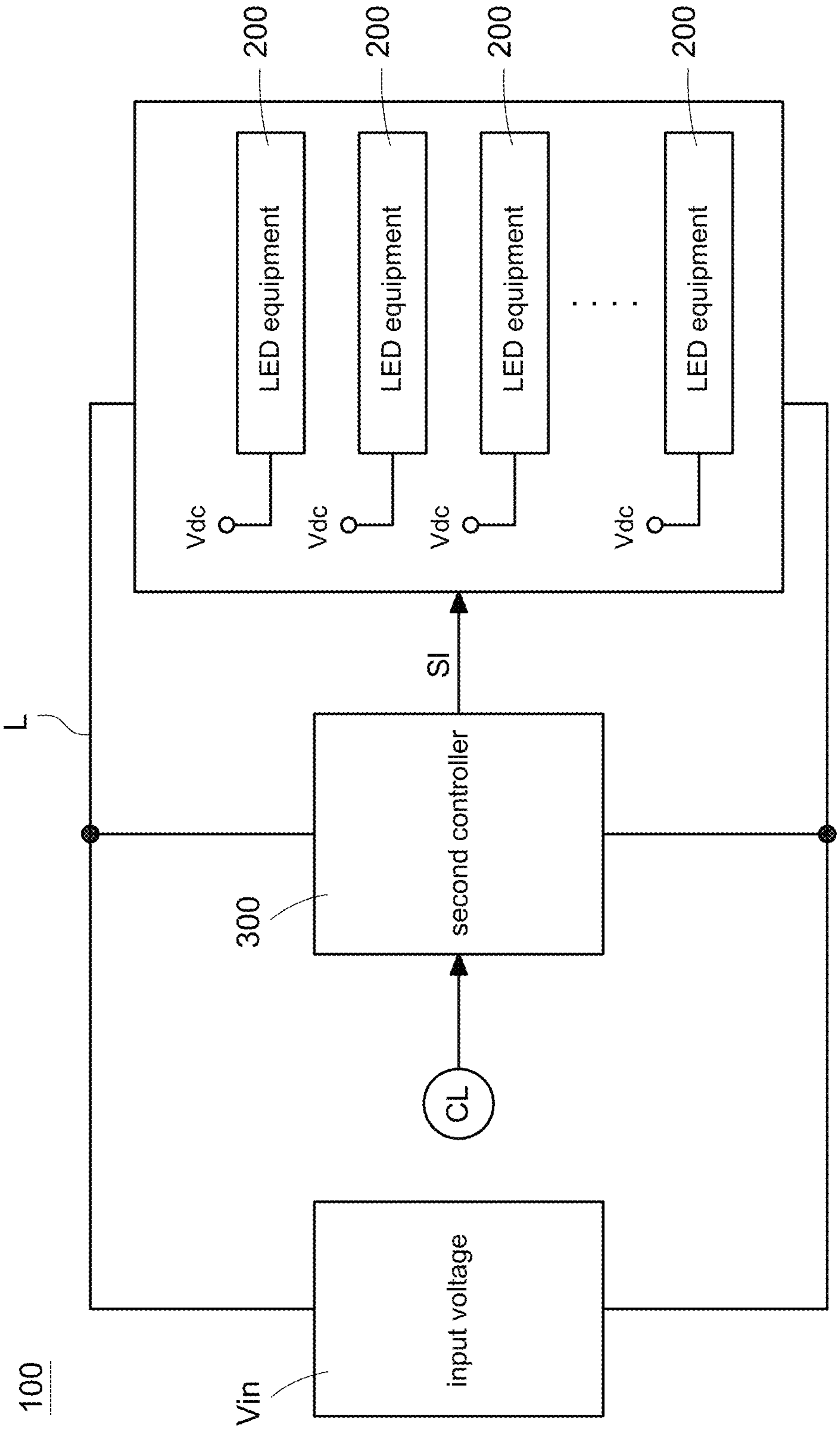
FIG. 2A is a block circuit diagram of an LED string with constant voltage control according to the present disclosure.

Please refer to FIG. 2A, which shows a block circuit diagram of an LED string with constant voltage control according to the present disclosure. The LED string 100 receives an input voltage Vin, and includes a power line L, a plurality of LED equipment 200 and an LED system controller 300 (hereinafter referred to as a second controller). The power line L receives the input voltage Vin, and the LED equipment 200 may, for example, form a parallel structure, so that the power line L transmits the input voltage Vin to each LED equipment 200. Therefore, when the LED equipment 200 forms a parallel structure, a DC voltage Vdc received by the LED equipment 200 is substantially the input voltage Vin.

The second controller 300 is coupled to the LED equipment 200, and provides a lighting signal S1 to the LED equipment 200 based on the lighting command CL. The second controller 300 is also coupled to the power line L to receive the input voltage Vin required for operation. Furthermore, the power line L has a line loss, and the input voltage Vin may have power loss due to the line loss, so that the DC voltage Vdc received by each LED equipment 200 is slightly different. Even the DC voltage Vdc received by each group of LED equipment 200 may be different. Taking the parallel structure as an example, when 50 groups of LED equipment 200 are coupled in parallel, the DC voltage Vdc received by the LED equipment 200 close to the input end is, for example but not limited to, 24V. However, due to the line loss of the power line L, the LED of the LED equipment 200 near the input end is brighter, but the LED of the LED equipment 200 at the rear end is darker. Therefore, the main purpose of the present disclosure is to make the brightness of the LED of each group of LED equipment 200 consistent and avoid the situation of different brightness, which will be further explained later.

Figure 2B:
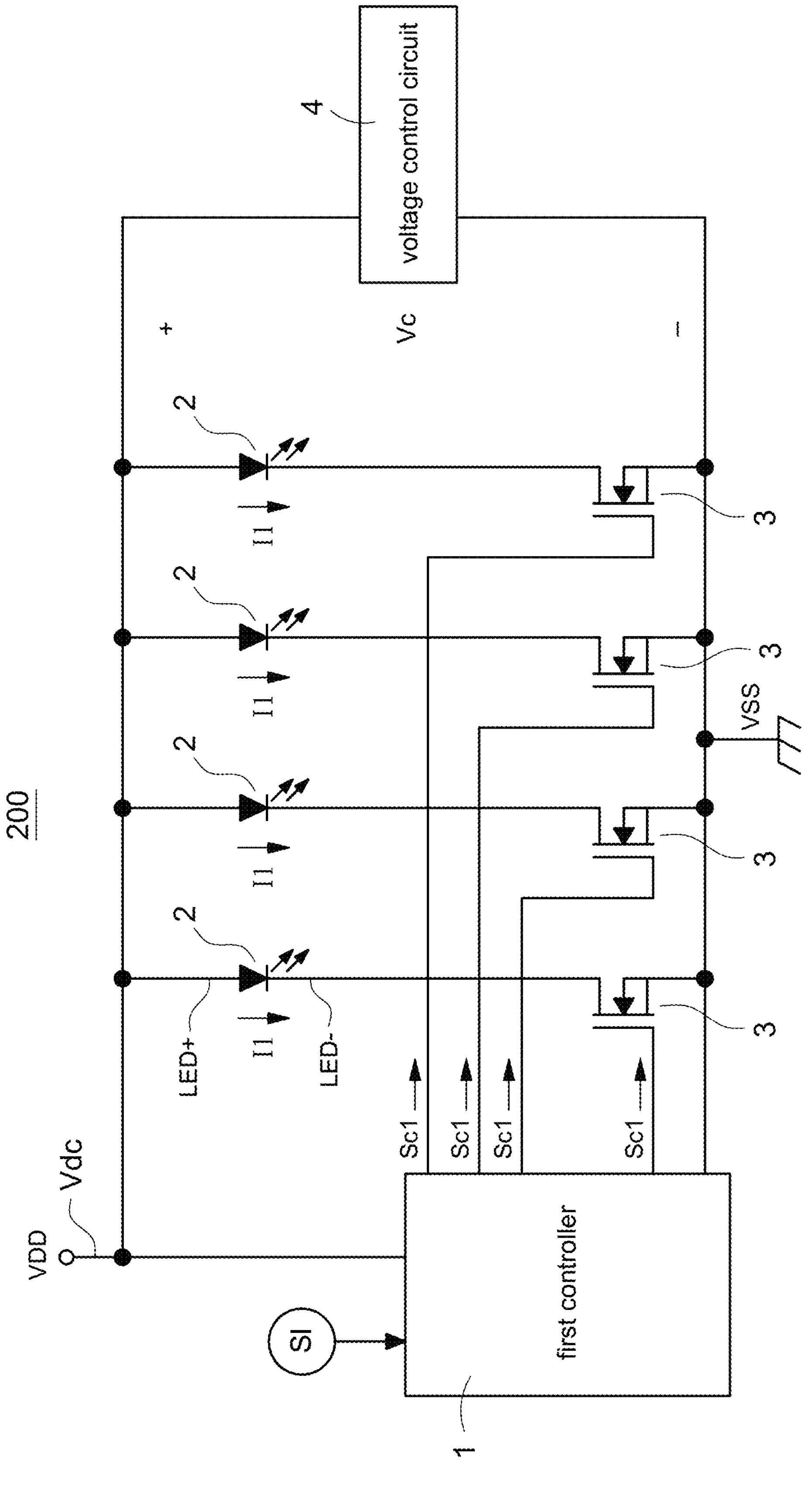
FIG. 2B is a block circuit diagram of an LED equipment with constant voltage control in the present disclosure.

Please refer to FIG. 2B, which shows a block circuit diagram of an LED equipment with constant voltage control in the present disclosure, and also refer to FIG. 2A. The LED equipment 200 receives the DC voltage Vdc and includes a first controller 1, at least one LED 2, at least one switch 3 and a voltage control circuit 4. The first controller 1 includes a positive end VDD and a negative end VSS, and the positive end VDD receives the DC voltage Vdc to operate. The LED 2 includes an anode end LED+ and a cathode end LED−. The switch 3 is correspondingly coupled to the LED 2 in series, and the control end of the switch 3 is coupled to the first controller 1. The number of LED 2 is corresponding to the number of switch 3, and as shown in FIG. 2, the number of LED 2 can be, for example but not limited to, one (single color), two (red plus green), three (three primary colors), four (three primary colors plus white), etc., the number of LED 2 can be increased or decreased according to actual needs. The voltage control circuit 4 is coupled to the positive end VDD and the negative end VSS, and is used for maintaining a fixed voltage Vc across the positive end VDD and the negative end VSS. In addition, the switch 3 can be, for example but not limited to, coupled between the cathode end LED− and the negative end VSS, or between the anode end LED+ and the positive end VDD.

Specifically, the first controller 1 generates a first control signal Sc1 based on the lighting signal S1, and controls the switch 3 to turn on/off based on the first control signal Sc1. When the switch 3 is turned on, a path from the positive end VDD, the anode end LED+, the cathode end LED−, the switch 3 to the negative end VSS forms a closed loop, so as to generate the first current I1 flowing from the anode end LED+ to the cathode end LED−. Since the DC voltage Vdc of each LED equipment 200 is slightly different, the first current I1 flowing from the anode end LED+ to the cathode end LED− is also slightly different, which is the main reason for the inconsistent brightness of the LED 2. In order to make the brightness of the LED 2 of each LED equipment 200 consistent, it is necessary to control the first current I1 to be consistent through the technical means of the present disclosure, so as to achieve the effect that the brightness of the LED 2 of each LED equipment 200 is consistent. Therefore, the present disclosure uses the voltage control circuit 4 to control the voltage Vc across the positive end VDD and the negative end VSS to be a fixed voltage to obtain a fixed current.

Specifically, since the voltage Vc of each LED equipment 200 is fixed at a fixed voltage (for example but not limited to 3V), the first current I1 flowing from the anode end LED+ to the cathode end LED− can be fixed at a fixed current. In this way, the first current I1 flowing through the LED 2 can be fixed as a fixed current, so that the brightness of the LED 2 is a fixed brightness corresponding to the fixed current, and then the brightness of the LED 2 of each LED equipment 200 can be controlled to be consistent. Any voltage control circuit 4, which can adjust the voltage Vc of each LED equipment 200 to a fixed voltage, should be included in the scope of this embodiment. The voltage control circuit is, for example but not limited to, electric circuits, programmable controllers with software control, analog controllers composed of hardware, or microcontrollers and other devices.

Figure 3:
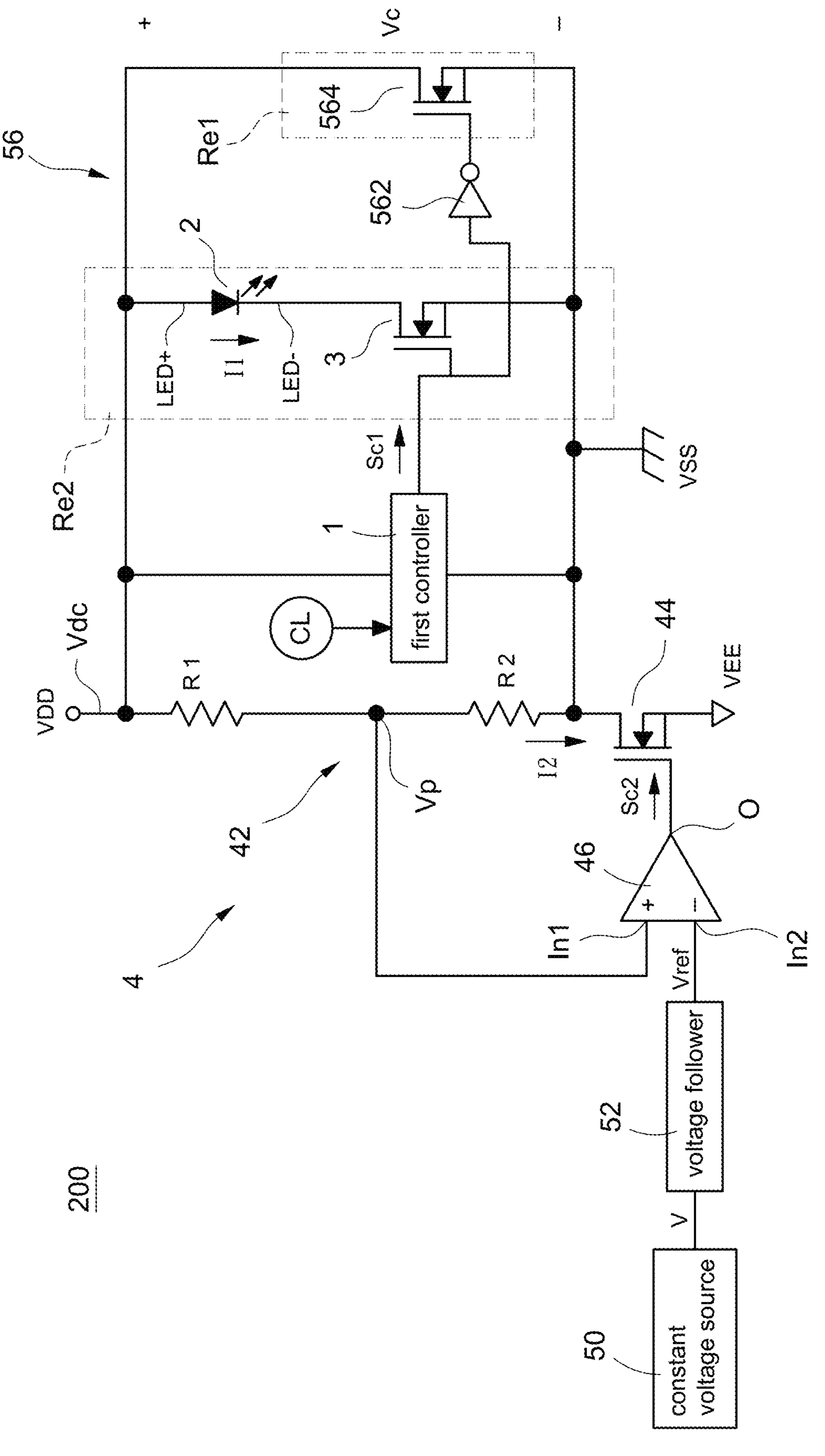
FIG. 3 is a block circuit diagram of the detailed structure of the LED equipment with constant voltage control according to the present disclosure.

Please refer to FIG. 3, which shows a block circuit diagram of the detailed structure of the LED equipment with constant voltage control according to the present disclosure, and refer also to FIG. 2A to 2B. The voltage control circuit 4 includes a voltage divider circuit 42, a transistor 44 and an amplifier 46, and the voltage divider circuit 42 is coupled between the positive end VDD and the negative end VSS to generate a divided voltage Vp based on the DC voltage Vdc. The voltage divider circuit 42 includes, for example, resistors R1, R2, so that the DC voltage Vdc generates the divided voltage Vp between the resistors R1 and R2. The transistor 44 is coupled between the voltage divider circuit 42 and a ground end VEE, and used for turning on/off the path from the voltage divider circuit 42 to the ground end VEE. The amplifier 46 includes a first input end In1, a second input end In2 and an output end O, and the first input end In1 is coupled to the voltage divider circuit 42 to receive the divided voltage Vp provided by the voltage divider circuit 42. The second input end In2 receives a reference voltage Vref, and the output end O is coupled to the control end of the transistor 44.

Further, transistor 44 is substantially controlled in the linear region. The amplifier 46 provides the second control signal Sc2 to the control end of the transistor 44 based on the divided voltage Vp and the reference voltage Vref to fix a channel width of the transistor 44. Therefore, the voltage control circuit 4 can adjust a voltage level of the negative end VSS by adjusting the channel width, so that the voltage level of the negative end VSS is adjusted to maintain the voltage Vc at the fixed voltage to obtain the fixed current. Specifically, since the second control signal Sc2 controls the voltage Vgs of the gate-source end of the transistor 44 to be a fixed value, the voltage Vds of the drain-source end of the transistor 44 is affected by the second current I2 (i.e. drain current Id) flowing through the transistor 44, so that the voltage level of the negative end VSS is adjusted. Therefore, by adjusting the voltage level of the negative end VSS, the voltage Vc between the positive end VDD and the negative end VSS can be maintained at the fixed voltage (such as but not limited to 3V).

Referring again to FIG. 3, the voltage control circuit 4 further includes a constant voltage source 50 and a voltage follower 52. The constant voltage source 50 is used to generate a constant voltage V, and the voltage follower 52 electrically isolates and amplifies the constant voltage V to generate the reference voltage Vref corresponding to the constant voltage V. Specifically, since the reference voltage Vref is preferably to be a stable and fixed value, it may not be easy to maintain its stability only by directly supplying the reference voltage Vref with the voltage source 50 alone (its stability is affected by, for example but not limited to, factors such as noise interference, loop current changes, etc.). Therefore, the reference voltage Vref may fluctuate slightly to cause the second current I2 to change, which cannot maintain the state of the voltage Vc being a constant voltage. Therefore, the electrical isolation and amplification characteristics of the voltage follower 52 can be used to isolate and amplify the constant voltage V electrical equipment into a reference voltage, thus avoiding interference from noise and maintaining the stability of the reference voltage. Therefore, the electrical isolation and amplification characteristics of the voltage follower 52 can be used to isolate and amplify the constant voltage V electrical equipment into the reference voltage Vref, avoiding interference from noise and maintaining the stability of the reference voltage Vref. In one embodiment, the constant voltage source 50 and the voltage follower 52 can be integrated in the first controller 1, or independently configured outside the first controller 1, and can also be implemented by devices such as circuits or controllers.

Referring again to FIG. 3, the voltage control circuit 4 further includes a bypass circuit 56. The bypass circuit 56 is coupled between the positive end VDD and the negative end VSS, and includes a first equivalent impedance Re1. When the switch 3 is turned on, the LED 2 and the switch 3 form a second equivalent impedance Re2, and the second equivalent impedance Re2 is equivalent to the internal resistance of the LED 2 plus the internal resistance when the switch 3 is turned on (that is, Rds_on). When the switch 3 is turned off, the bypass circuit 56 provides the first equivalent impedance Re1 equivalent to the second equivalent impedance Re2 to maintain the voltage Vc at the fixed voltage. Specifically, when the switch 3 is turned off, the path from the LED 2 to the negative end VSS is open-circuit. In this way, even if the control of the voltage control circuit 4 is used, the cross-voltage Vc may still be changed due to the large impedance difference between the positive terminal VDD and the negative terminal VSS. Therefore, even the voltage control circuit 4 is used to conduct control, the voltage Vc may still be changed due to the large impedance difference between the positive end VDD and the negative end VSS. Therefore, preferably, the bypass circuit 56 is used to replace the equivalent impedance of switch 3 (that is, the switch 3 is turned on) when the switch 3 is turned off, such that the voltage Vc between the positive end VDD and the negative end VSS is more stable at the fixed voltage when the switch 3 is turned on/off.

Further, the bypass circuit 56 may include a reverse circuit 562 and a bypass switch 564. The reverse circuit 562 may be, for example but not limited to, a reverse gate, and the reverse circuit 562 is coupled to the first controller 1 to receive the first control signal Sc1. The bypass switch 564 is coupled between the positive end VDD and the negative end VSS, and includes the first equivalent impedance Re1 when the bypass switch 564 is turned on. Furthermore, since the reverse circuit 562 can provide the effect of reversing the signal, the actions of the switch 3 and the bypass switch 564 is preferably to be completely opposite. Therefore, the first controller 1 controls the on/off of the bypass switch 564 to be reversed to the switch 3 through the reverse circuit 562, so that when the bypass switch 564 is turned on, the first equivalent impedance Re1 equivalent to the second equivalent impedance Re2 is provided. That is, the bypass switch 564 is turned on when the switch 3 is turned off, and the bypass switch 564 is turned off when the switch 3 is turned on. On the other hand, the number of groups of the reverse circuit 562 and the bypass switch 564 may correspond to the quantity of the LED 2, so that each LED 2 has a set of equivalently replaceable impedances. Alternatively, the entire set of LED equipment 200 may only include a single set of bypass circuits 56, so that the equivalent impedance of all LED 2 inside the entire LED equipment 200 is replaced by a single set of bypass circuits 56.

In one embodiment, since the first equivalent impedance Re1 (that is, Rds_on when the bypass switch 564 is turned on) is equal to the internal resistance of the LED 2 plus the internal resistance of the switch 3 (that is, Rds_on when the bypass switch 3 is turned on) when the switch 3 is turned on, the internal resistance (Rds_on) of the bypass switch 564 is preferably to be higher than the internal resistance (Rds_on) of the switch 3. On the other hand, the voltage control circuit 4 and the bypass circuit 56 shown in FIG. 3 are only an exemplified cost-effective implementation among many implementations, which are only composed of relatively cheap circuit components. However, the voltage control circuit 4 and the bypass circuit 56 are not limited to the embodiment shown in FIG. 3. All circuits, controllers and other devices that can achieve the above effects should be included in the scope of this embodiment.

Figure 4A:
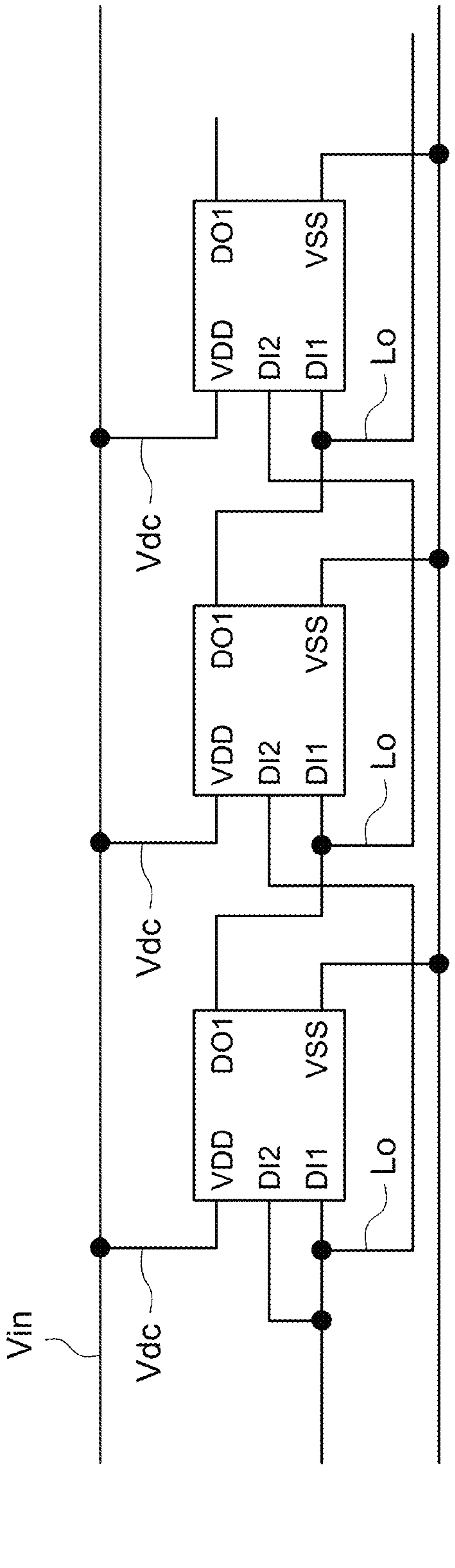
FIG. 4A is a block circuit diagram of the detailed structure of the LED string according to the first embodiment of the present disclosure.

Please refer to FIG. 4A, which shows a block circuit diagram of the detailed structure of the LED string according to the first embodiment of the present disclosure, and refer also to FIG. 2A to 3. In the embodiment of FIG. 4A, the LED equipment 200 of the LED string 100 are shown in a parallel structure, but series connection is not excluded. The LED equipment 200 further includes a first signal receiving end DI1 and a first signal output end DO1, the LED equipment 200 is sequentially coupled with each in a manner that the first signal output end DO1 of the LED equipment 200 is coupled to the first signal receiving end DI1 of a next-stage LED equipment to form a serial connection, the first signal receiving end DI1 of the LED equipment 200 which is the first one in the series connection is coupled to the second controller 300. In this way, under the condition that each LED equipment 200 is operating normally, the lighting signal S1 provided by the second controller 300 can be transmitted to each LED equipment 200 through an internal transmission of the LED equipment 200.

In FIG. 4A, the LED equipment 200 further includes a second signal receiving end DI2. The second signal receiving end DI2 is coupled to the first signal receiving end DI1 of a previous-stage LED equipment 200 through an external circuit Lo. The second signal receiving end DI2 of the LED equipment 200 which is the first one in the series is coupled to the first signal receiving end DI1 of itself. When the LED equipment 200 is operating normally and the first signal receiving end DI1 receives the lighting signal S1, the LED equipment 200 disables the second signal receiving end DI2, so that the lighting signal S1 provided by the second controller 300 can be transmitted to each LED equipment 200 through the internal transmission of the LED equipment 200 (namely, it enters from the first signal receiving end DI1 and outputs from the first signal output end DO1). When the LED equipment 200 malfunctions (for example, failure or damage of the LED equipment 200), the LED equipment 200 cannot operate, so even after the first signal receiving end DI1 receives the lighting signal S1, the LED equipment 200 cannot process the lighting signal S1 (such as performing temporary storage, amplification, etc.), so that the lighting signal S1 cannot be transmitted to the first signal output end DO1 through the internal transmission of the LED equipment 200.

Therefore, the LED equipment 200 disclosed in this disclosure provides the function of continuous transmission from breakpoints, so as to avoid the failure of one of the LED equipment 200 in the LED string 100 and cause the LED equipment 200 coupled behind to fail to receive the lighting signal S1 and all fail. Specifically, the LED equipment 200 is based on the fact that when the first signal receiving end DI1 does not receive the lighting signal S1 for a predetermined time period, it means that the previous stage of the LED equipment 200 may fail. Therefore, when the first signal receiving end DI1 does not receive the lighting signal S1 for a predetermined time period, the LED equipment 200 is switched to enables the second signal receiving end DI2 to receive the lighting signal S1 on the first signal receiving end DI1 of the previous-stage LED equipment 200 through the second signal receiving end DI2 and the external circuit Lo.

Figure 4B:
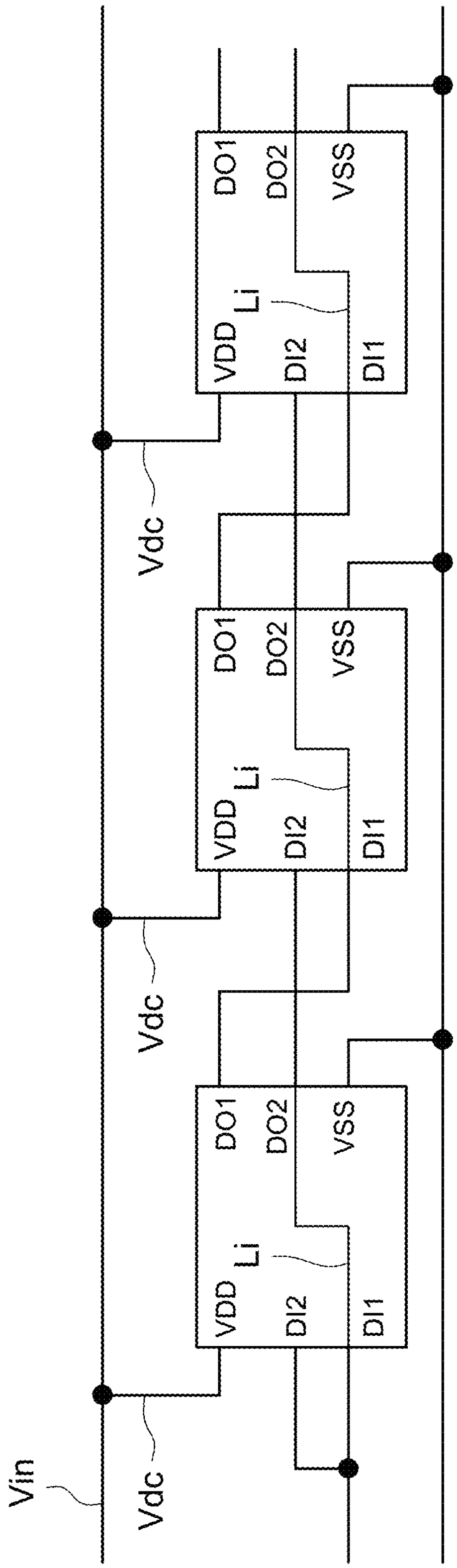
FIG. 4B is a block circuit diagram of the detailed structure of the LED string according to the second embodiment of the present disclosure.

Please refer to FIG. 4B, which shows a block circuit diagram of the detailed structure of the LED string according to the second embodiment of the present disclosure, and refer also to FIG. 2A to 4A. The difference between FIG. 4B and FIG. 4A is that the LED equipment 200 further includes a second signal output end DO2. The LED equipment 200 respectively include an internal circuit Li connecting the first signal receiving end DI1 and the second signal output end DO2, and the second signal output end DO2 of each LED equipment 200 is coupled to the second signal output end DO2 of the previous-stage LED equipment 200. When the LED equipment 200 operates normally, the LED equipment 200 controls the internal circuit to open-circuit, so that the lighting signal S1 can be transmitted from the first signal receiving end DI1 to the first signal output end DO1 through the internal transmission of the LED equipment 200. When one of the LED equipment 200 of the LED string 100 fails, the failed LED light device 200 actively controls its internal circuit Li to short-circuit, so that the LED equipment 200 provides the lighting signal S1 to the second signal output end DO2 through the internal circuit Li, so as to provide the lighting signal S1 from the second signal output terminal DO2 of the previous-stage LED equipment 200 to the second signal output terminal DO2 of the next-stage LED equipment 200.

The internal circuit Li can be set to the state of a normally on, which means it is turned on even when the LED equipment 200 is not operating, so that the internal circuit Li is automatically turned on when the LED equipment 200 fails and needs not any signal control. In addition, in an embodiment of the present disclosure, the structures and operation not described in FIG. 4B are the same as those in FIG. 4A, and they will not be repeated here for brevity.

Figure 4C:
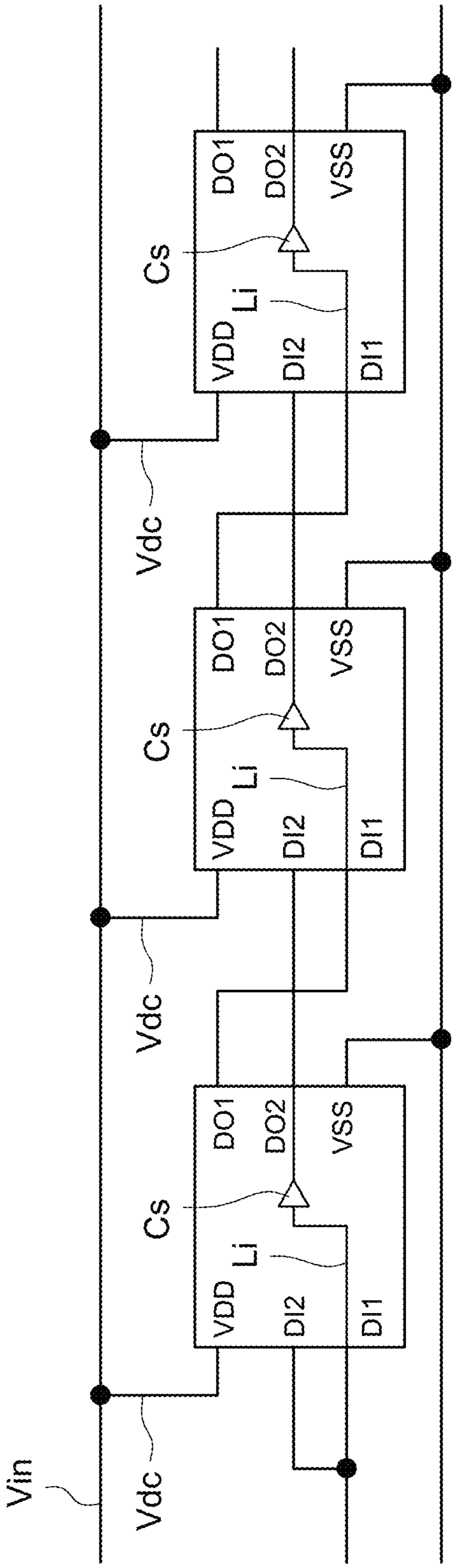
FIG. 4C is a block circuit diagram of the detailed structure of the LED string according to the third embodiment of the present disclosure.

Please refer to FIG. 4C, which shows a block circuit diagram of the detailed structure of the LED string according to the third embodiment of the present disclosure, and also refer to FIG. 2A to 4B. The difference between FIG. 4C and FIG. 4B is that the LED lamp equipment 200 further includes a buffer circuit Cs. The buffer circuit Cs is connected in series with the internal circuit Li, and is used for buffering and amplifying the lighting signal S1. Furthermore, since the LED equipment 200 is implemented by using miniaturized components such as a controller, the wiring of the internal circuit Li is thinner, and the lighting signal S1 transmitted is easily affected by noise and distorted. Therefore, by connecting the buffer circuit Cs in series with the internal circuit Li, the effects of noise on the lighting signal S1 can be reduced through the functions of buffering and amplification. More particularly, the buffer circuit Cs may be, for example but not limited to, a snubber gate. All circuits or components capable of suppressing noise on the line and amplifying signals should be included in the scope of this embodiment. In addition, in an embodiment of the present disclosure, the structures and operation not described in FIG. 4C are the same as those in FIG. 4B, and will not be repeated here for brevity.

Figure 4D:
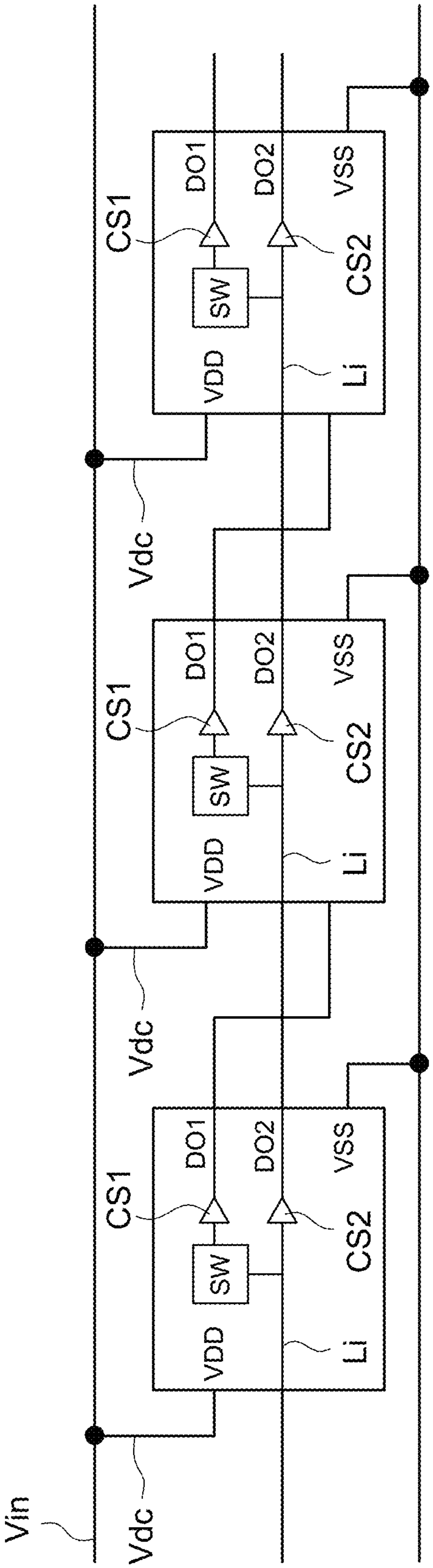
FIG. 4D is a circuit block diagram of the detailed structure of the LED string according to the fourth embodiment of the present disclosure.

Please refer to FIG. 4D, which shows a block circuit diagram of the detailed structure of the LED string according to the fourth embodiment of the present disclosure, and also refer to FIG. 2A to 4C. The difference between embodiments in FIG. 4D and FIG. 4C is that the LED equipment 200 in FIG. 4D only includes the first signal receiving end DI1, and the LED equipment 200 also includes a switching circuit SW. The switching circuit SW is coupled to the first signal output end DO1 and the second signal output end DO2, and the first signal output end DO1 and the second signal output end DO2 are jointly coupled to the first signal receiving end DI1 of the next-stage LED equipment 200 by an external line. The single action of the switching circuit SW only turns on a single signal output terminal, and when the LED equipment 200 is operating normally, the switching circuit SW is switched to enable the first signal output end DO1, so that the lighting signal S1 is provided from the first signal output end DO1 to the first signal receiving end DI1. Otherwise, when one of the LED equipment 200 of the LED string 100 fails, the switching circuit SW of the failed LED lamp equipment 200 actively switches to enable the second signal output end DO2, so as to provide the lighting signal S1 to the second signal output end DO2 through the internal circuit Li.

Please refer to FIG. 4D, the LED lamp equipment 200 further includes a first buffer circuit Cs1 and a second buffer circuit Cs2. The functions of the first buffer circuit Cs1 and the second buffer circuit Cs2 are the same as those described in FIG. 4C, and are used for buffering and amplifying the lighting signal S1. That is, the first buffer circuit Cs1 is coupled in series with the first signal output end DO1, and is used for buffering and amplifying the lighting signal S1 flowing through the first signal output end DO1. The second buffer circuit Cs2 is coupled in series with the second signal output end DO2, and is used for buffering and amplifying the lighting signal S1 flowing through the second signal output end DO2. In one embodiment, the internal circuit Li is similar to that shown in FIG. 4B, and can form the state of the normally on by the switching circuit SW. In addition, in an embodiment of the present disclosure, the structures and operation not described in FIG. 4D are the same as those in FIG. 4C, and will not be repeated here for brevity.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A light-emitting diode (LED) equipment with constant voltage control configured to receive a DC voltage, the LED equipment comprising:

a first controller comprising a positive end and a negative end, and the positive end receiving the DC voltage, at least one LED comprising an anode end and a cathode end, at least one switch correspondingly coupled in series with the at least one LED, and a number of the at least one LED corresponds to a number of the at least one switch, a voltage control circuit coupled to the positive end and the negative end, and a bypass circuit coupled between the positive end and the negative end, and comprising a first equivalent impedance, wherein the at least one LED and the at least one switch comprise a second equivalent impedance when the at least one switch is turned on, and when the at least one switch is turned off, the bypass circuit is configured to provide the first equivalent impedance equivalent to the second equivalent impedance to maintain the voltage at the fixed voltage to obtain the fixed current, wherein the first controller is configured to control the at least one switch to be turned on or turned off based on a first control signal, so as to generate a first current flowing from the anode end to the cathode end when the at least one switch is turned on; when the at least one switch is turned on and the DC voltage is affected by a line loss, the voltage control circuit is configured to control a voltage across the positive end and the negative end to a fixed voltage without being affected by the line loss, so as to control the first current flowing through the anode end to the cathode end to be a fixed current when the at least one switch is turned on and the DC voltage is affected by the line loss, so that a brightness of the at least one LED is corresponding to the fixed current and has a fixed brightness.

2. The LED equipment as claimed in claim 1, wherein the voltage control circuit comprises:

a voltage divider circuit coupled between the positive end and the negative end, and configured to generate a divided voltage based on the DC voltage, a transistor coupled between the voltage divider circuit and a ground end, and an amplifier comprising a first input end, a second input end and an output end, the first input end configured to receive the divided voltage, the second input end configured to receive a reference voltage, and the output end coupled to a control end of the transistor, wherein the amplifier is configured to provide a second control signal to the control end of the transistor based on the divided voltage and the reference voltage to fix a channel width of the transistor, and configured to adjust a voltage level of the negative end based on a second current flowing through the transistor, so as to maintain the voltage as the fixed voltage by adjusting the voltage level.

3. The LED equipment as claimed in claim 2, wherein the voltage control circuit further comprises:

a constant voltage source configured to generate a constant voltage; and a voltage follower configured to electrically isolate and amplify the constant voltage to generate the reference voltage corresponding to the constant voltage.

4. The LED equipment as claimed in claim 1, wherein the bypass circuit comprises:

a reverse circuit coupled to the first controller, and a bypass switch coupled between the positive end and the negative end, and comprising the first equivalent impedance when the bypass switch is turned on, wherein the first controller is configured to control the bypass switch to turn on or turn off through the reverse circuit, so as to provide the first equivalent impedance equivalent to the second equivalent impedance when the bypass switch is turned on;

wherein the bypass switch is turned on when the at least one switch is turned off, and the bypass switch is turned off when the at least one switch is turned on.

5. A light-emitting diode (LED) string with constant voltage control configured to receive a DC voltage, the LED string comprising:

a power line configured to receive the input voltage, a plurality of LED equipment coupled to the power line, and each LED equipment comprising:

a first controller comprising a positive end and a negative end, and the positive end receiving the DC voltage, at least one LED comprising an anode end and a cathode end, at least one switch correspondingly coupled in series with the at least one LED, and a number of the at least one LED corresponds to a number of the at least one switch, and a voltage control circuit coupled to the positive end and the negative end, and a second controller coupled to the LED equipment and configured to provide a lighting signal to the LED equipment based on a lighting command, so that the LED equipment provide the first control signal based on the lighting signal, wherein each of the LED equipment further comprises a first signal receiving end and a first signal output end, the LED equipment sequentially couple with each in a manner that the first signal output end of the LED equipment is coupled to the first signal receiving end of a next-stage LED equipment to form a serial connection, the first signal receiving end of the LED equipment which is a first one in the serial connection is coupled to the second controller, so that the lighting signal is transmitted to each LED equipment through an internal transmission of the LED equipment, and wherein the first controller is configured to control the at least one switch to be turned on or turned off based on a first control signal, so as to generate a first current flowing from the anode end to the cathode end when the at least one switch is turned on; the voltage control circuit is configured to control a voltage across the positive end and the negative end to a fixed voltage, so as to control the first current to be a fixed current, so that a brightness of the at least one LED is corresponding to the fixed current and has a fixed brightness.

6. The LED string as claimed in claim 5, wherein the LED equipment further comprises:

a second signal receiving end coupled to the first signal receiving end of a previous stage of the LED equipment through an external circuit, the LED equipment configured to disable the second signal receiving end when the first signal receiving end receives the lighting signal, wherein the LED equipment is switched to enable the second signal receiving end to receive the lighting signal through the second signal receiving end when the first signal receiving end does not receive the lighting signal for a predetermined time period.

7. The LED string as claimed in claim 5, wherein the LED equipment further comprising:

a second signal output end, the LED equipment respectively comprising an internal circuit coupled to the first signal receiving end and the second signal output end, and the LED equipment configured to control the internal circuit to open-circuit when the LED equipment operating normally, and a second signal receiving end coupled to the second signal output end of a previous stage of the LED equipment, and when one of the LED equipment of the LED string fails, the failed LED equipment configured to control the internal circuit to short-circuit to provide the lighting signal through the internal circuit.

8. The LED string as claimed in claim 7, wherein the LED equipment further comprises:

a buffer circuit coupled in series with the internal circuit and configured to buffer and amplify the lighting signal.

9. The LED string as claimed in claim 5, wherein the LED equipment further comprises:

a second signal output end, the LED equipment respectively comprising an internal circuit coupled to the first signal receiving end and the second signal output end, and a switching circuit coupled to the first signal output end and the second signal output end, the switching circuit configured to switch to enable the first signal output end when the LED equipment operates normally, so as to provide the lighting signal from the first signal output end, wherein when one of the LED equipment of the LED string fails, the switching circuit of the failed LED equipment is configured to switch to enable the second signal output end, so as to provide the lighting signal to the second signal output end from the internal circuit.

10. The LED string as claimed in claim 9, wherein the LED equipment further comprises:

a first buffer circuit coupled in series with the first signal output end, and configured to buffer and amplify the lighting signal flowing through the first signal output end, and a second buffer circuit coupled in series with the second signal output end, and configured to buffer and amplify the lighting signal flowing through the second signal output end.

* * * * *